(12) United States Patent
Sakoguchi et al.

(10) Patent No.: US 12,100,432 B1
(45) Date of Patent: Sep. 24, 2024

(54) ENERGY-ASSISTED MAGNETIC RECORDING DATA STORAGE DEVICE WITH AVERAGED MEASUREMENT MITIGATION OF ENERGY COMPONENT PROTRUSION

(71) Applicant: WESTERN DIGITAL TECHNOLOGIES, INC., San Jose, CA (US)

(72) Inventors: Aiko Sakoguchi, Kanagawa (JP); Masaru Furukawa, Kanagawa (JP); Kenji Tasaka, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,917

(22) Filed: Aug. 11, 2023

Related U.S. Application Data

(60) Provisional application No. 63/524,062, filed on Jun. 29, 2023, provisional application No. 63/454,519, filed on Mar. 24, 2023.

(51) Int. Cl.
*G11B 5/60* (2006.01)
*G11B 5/00* (2006.01)

(52) U.S. Cl.
CPC ...... *G11B 5/607* (2013.01); *G11B 2005/0021* (2013.01)

(58) Field of Classification Search
CPC .............. G11B 5/607; G11B 2005/0021
See application file for complete search history.

(56) References Cited

U.S. PATENT DOCUMENTS

| | | | |
|---|---|---|---|
| 8,897,104 B1 | 11/2014 | Yan et al. | |
| 8,908,483 B1 | 12/2014 | Ren et al. | |
| 9,685,182 B1 | 6/2017 | Granz et al. | |
| 9,704,529 B1 | 7/2017 | Lou et al. | |
| 9,881,641 B1 | 1/2018 | Canchi et al. | |
| 10,997,997 B1 | 5/2021 | Xiong | |
| 11,514,946 B1 * | 11/2022 | Shi | G11B 5/314 |
| 11,587,586 B1 | 2/2023 | Yasuna et al. | |
| 11,587,587 B1 | 2/2023 | Yasuna et al. | |

(Continued)

OTHER PUBLICATIONS

Q. Cheng et al., "Measurement of angstrom-level laser induced protrusion using touchdown in heat-assisted magnetic recording", in Applied Physics Letter, Oct. 12, 2020; 117 (15): 153105, 6 pages. https://doi.org/10.1063/5.0029051.

*Primary Examiner* — Andrew Sasinowski
(74) *Attorney, Agent, or Firm* — Calderon Safran & Wright, P.C.

(57) ABSTRACT

Various illustrative aspects are directed to a data storage device, comprising one or more disks; an actuator mechanism configured to position one or more heads proximate to a corresponding disk surface of a corresponding disk of the one or more disks; and one or more processing devices. The one or more processing devices are configured to: determine a plurality of readings of an energy sensor output from an energy sensor disposed on the selected head during a rotation of the corresponding disk; determine an average of the readings of the energy sensor output; and use the average of the readings of the energy sensor output as a control parameter for controlling a fly height of the selected head.

20 Claims, 12 Drawing Sheets

(56) References Cited

U.S. PATENT DOCUMENTS

| | | | |
|---|---|---|---|
| 2013/0107678 A1* | 5/2013 | Mukoh | G11B 5/455 |
| | | | 369/13.32 |
| 2014/0269238 A1* | 9/2014 | Kautzky | G11B 5/3133 |
| | | | 360/59 |
| 2015/0085630 A1* | 3/2015 | Macken | G11B 5/4866 |
| | | | 369/13.33 |
| 2015/0235663 A1* | 8/2015 | Canchi | G11B 5/6088 |
| | | | 369/13.11 |
| 2016/0254020 A1* | 9/2016 | Gao | G11B 5/596 |
| | | | 369/13.11 |

* cited by examiner

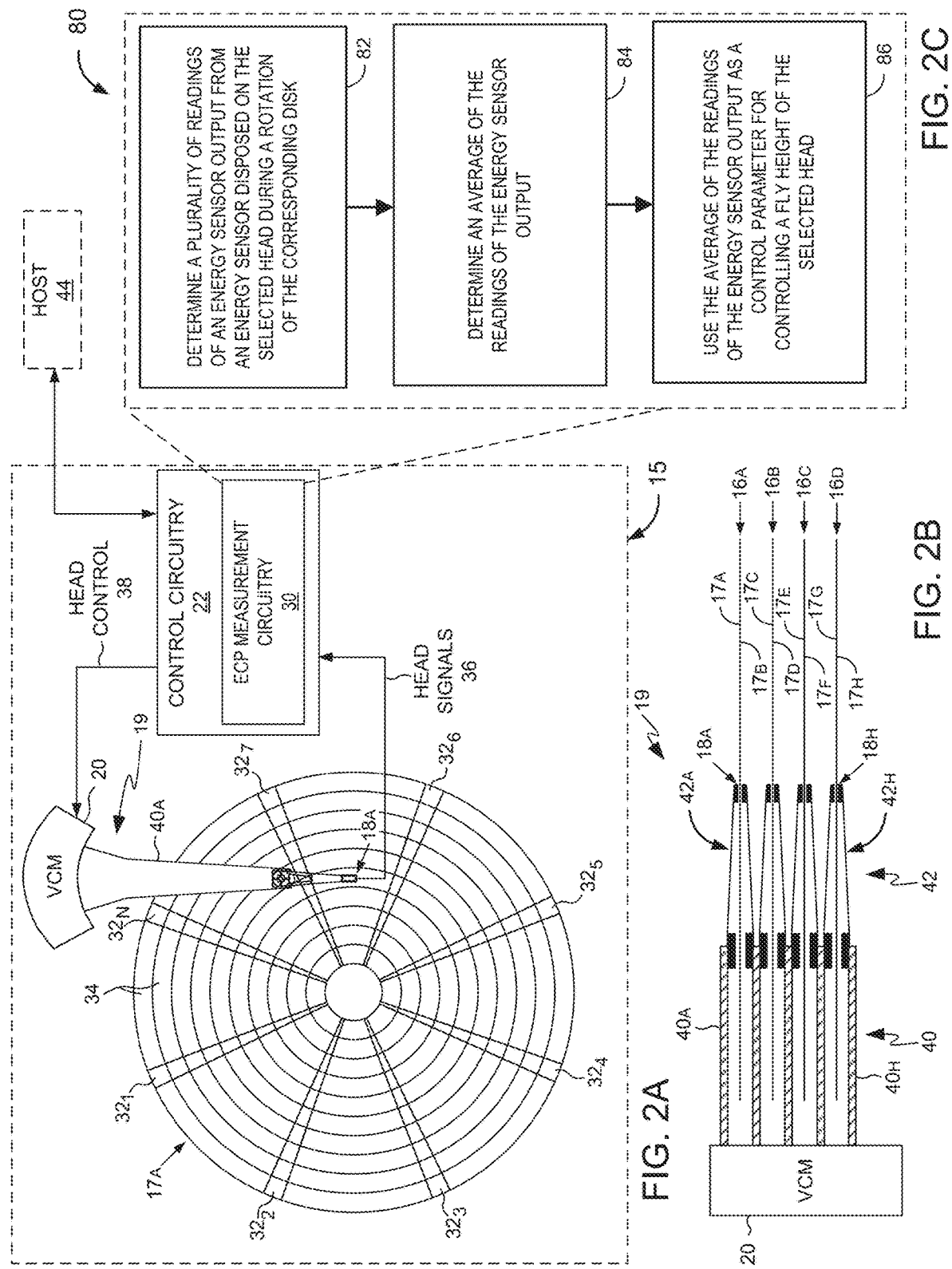

ENERGY-ASSISTED MAGNETIC RECORDING DATA STORAGE DEVICE WITH AVERAGED MEASUREMENT MITIGATION OF ENERGY COMPONENT PROTRUSION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive measurement and characterization of protrusion of one or more energy interface components in read/write heads during write operations, to support fine control of head-media spacing (HMS) and effective fly height (FH) of each slider above or proximate to each corresponding media disk surface, in energy-assisted magnetic recording. In various examples, control circuitry of this disclosure is inventively configured to measure and characterize laser power-induced thermal protrusion of an energy component, an energizing component, or an energy interface component. In an illustrative example, control circuitry of this disclosure is inventively configured to measure and characterize laser power-induced thermal protrusion of an energy component in the form of a near-field transducer (NFT) that conducts a laser emitted by a laser diode of the read/write head during write operations, to support fine control of head-media spacing and fly height of the slider above the corresponding media disk surface in heat-assisted magnetic recording (HAMR).

In an illustrative example, the NFT in the read/write head ("head") provides confined heat from a laser diode comprised in the head to the disk surface media. Heat generated by the laser diode is partially absorbed in the NFT, which leads to localized protrusion (NFT protrusion) of a portion of the head toward the disk surface. Since the NFT protrusion area is narrow, it is difficult to measure by conventional touch-down based methods used to measure write element protrusion.

Burst write scheme (BWS) measurement is a proposed method for NFT protrusion measurements, in various examples. BWS implements two writing modes: steady-state writing, in which the NFT is fully protruded, and burst writing, in which the NFT protrusion is quite small. The control circuitry may use the readback amplitude curve as a function of thermal fly height control (TFC) power in each writing mode for NFT protrusion calculation. The readback amplitude usually increases as TFC power increases, as spacing between the head and the disk surface media gets closer. However, for steady-state writing, unintentional readback amplitude drops have been observed in some heads, which directly affects the result of the NFT protrusion. From the relation between the readback amplitude and a thermal sensor output from a thermal sensor proximate to the NFT, which reflects NFT temperature, it has been found that laser mode hops between different laser emission modes in the laser diode may typically cause the unintended amplitude drop.

Among the inventive insights of this disclosure, since the readback amplitude in one revolution of continuous writing typically fluctuates by several laser mode hops, an averaged amplitude over the course of the disk revolution may include several laser modes, and is effective for the control circuitry to plot and apply a stable steady-state writing curve in operating the head in data write operations. Inventive aspects of this disclosure include novel control circuitry that successfully mitigates and compensates for amplitude drop, such as may be induced by laser mode hops and which would otherwise cause anomalous changes in fly height of the slider, by determining and using an averaged amplitude of energy sensor readings in continuous steady-state writing. Actual NFT protrusion change due to changes in laser output heating change may be relatively small, yet laser mode hops may cause substantial impacts on NFT protrusion measurement error and readback amplitude. In one example, the determined value of NFT protrusion measured by such methods of this disclosure may be twice as large as the determined value by conventional methods, reflecting a much more accurate determination of NFT protrusion and enabling much more accurate control of data write operations in energy-assisted magnetic recording, by avoiding underestimation of NFT protrusion due to laser amplitude drop or other energy amplitude drop. Control circuitry of this disclosure may similarly perform averaged amplitude determinations and/or mitigations of energy-induced morphological effects to a wide, general variety of energy interface components and energy-bearing components in energy-assisted magnetic recording of various types, including HAMR and such as microwave-assisted magnetic recording (MAMR).

Various illustrative aspects are directed to a data storage device, comprising one or more disks; an actuator mechanism configured to position one or more heads proximate to a corresponding disk surface of a corresponding disk of the one or more disks; and one or more processing devices. The one or more processing devices are configured to: determine a plurality of readings of an energy sensor output from an energy sensor disposed on the selected head during a rotation of the corresponding disk; determine an average of the readings of the energy sensor output; and use the average of the readings of the energy sensor output as a control parameter for controlling a fly height of the selected head.

Various illustrative aspects are directed to a method comprising determining, by one or more processing devices, a plurality of readings of an energy sensor output from an energy sensor disposed on a selected head during a rotation of a corresponding disk of one or more disks comprised in a data storage device; determining, by one or more processing devices, an average of the readings of the energy sensor output; and using, by one or more processing devices, the average of the readings of the energy sensor output as a control parameter for controlling a fly height of the selected head.

Various illustrative aspects are directed to one or more processing devices comprising means for determining a plurality of readings of an energy sensor output from an energy sensor disposed on a selected head during a rotation of a corresponding disk of one or more disks comprised in a data storage device; means for determining an average of the readings of the energy sensor output; and means for using the average of the readings of the energy sensor output as a control parameter for controlling a fly height of the selected head.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, in accordance with aspects of the present disclosure.

FIG. 4-1 depicts a schematic of an ideal BWS curve, in accordance with aspects of the present disclosure.

FIG. 4-2 depicts a graph of an example of a BWS curve for NFT protrusion measurements.

FIG. 4-3A depicts a graph of a readback amplitude drop in steady-state writing curve.

FIG. 4-3B depicts a graph of a readback amplitude profile from the start of writing, in accordance with aspects of the present disclosure.

FIG. 4-4 depicts a graph of laser current dependence of thermal sensor output, in accordance with aspects of the present disclosure.

FIG. 4-5 depicts a graph of simultaneous measurements of readback amplitude and thermal sensor output over write time in one revolution of a disk of continuous writing, in accordance with aspects of the present disclosure.

FIG. 4-6 depicts a graph of BWS curves of thermal sensor output over TFC power with two steady-state writing methods: an inventive method of this disclosure of averaging of one revolution continuous steady-state writing, in accordance with aspects of the present disclosure, and a conventional method that uses only the specific time after several hundred microseconds from the start of writing.

FIG. 5 depicts a graph of measurement circuitry averaging a plurality of readings of readback amplitude detected by a read element at various points in time over a continuous write operation, to determine an averaged readback amplitude of the readings of the energy sensor output of read element, in accordance with aspects of the present disclosure.

FIG. 6 depicts a graph of measurement circuitry averaging pluralities of readings of readback amplitude detected by read element at various points in time over both a continuous write operation and a burst write operation to determine averaged readback amplitudes of the readings of the energy sensor output of read element in both a continuous write operation and in a burst write scheme write operation, in accordance with aspects of the present disclosure.

DETAILED DESCRIPTION

Figure 1:
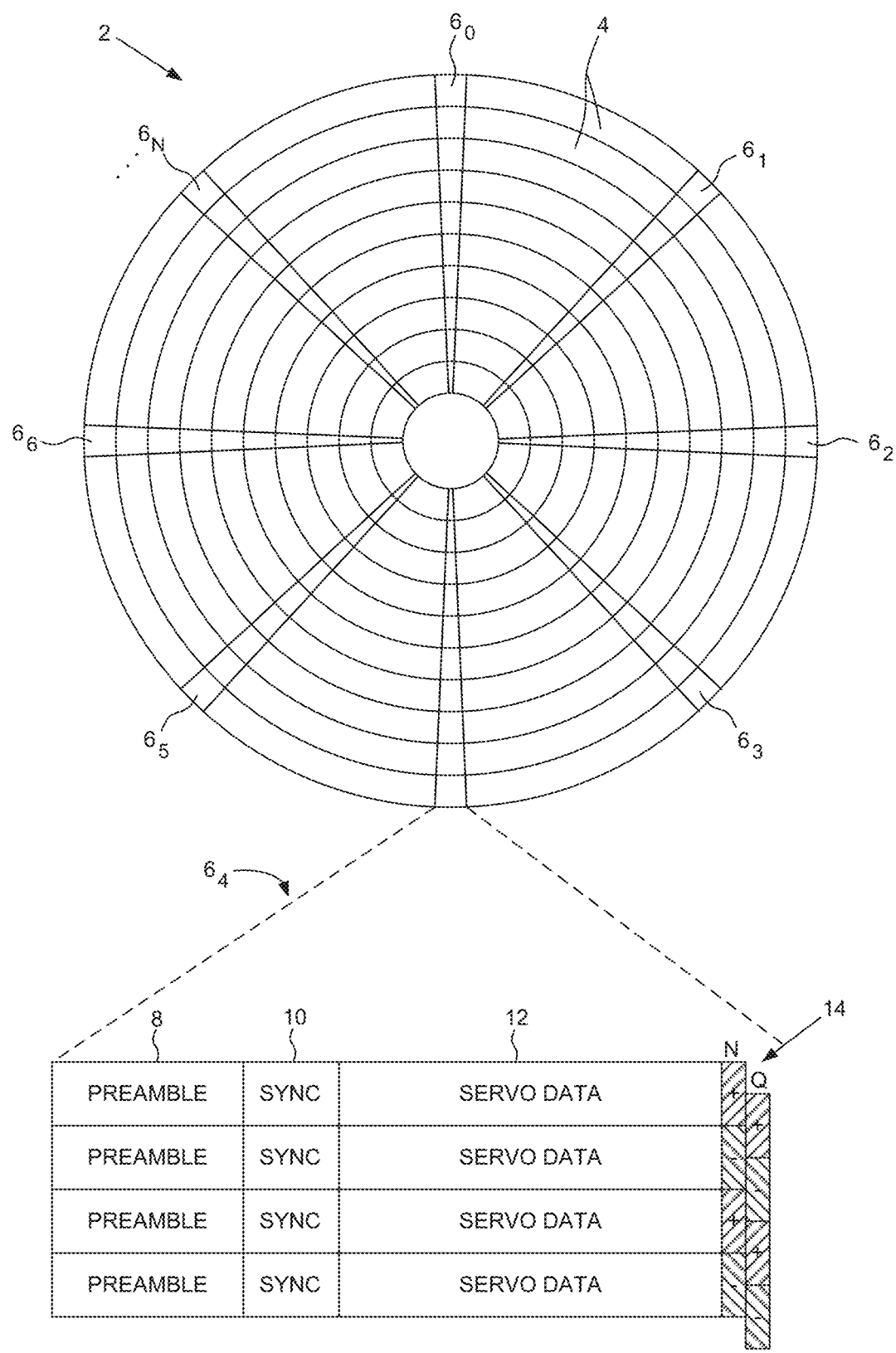
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises energized component protrusion measurement circuitry 30 ("ECP measurement circuitry 30"). ECP measurement circuitry 30 may perform measurement of near-field transmitter (NFT) protrusion in both continuous write operations and burst write scheme (BWS) operations, in some examples in which an NFT is an energized component prone to protrusion impacted by laser mode hops in a laser diode as an irregular or unpredictable effect on protrusion and fly height. ECP measurement circuitry 30 may thus be implemented as continuous write operation and BWS NFT protrusion measurement circuitry 30, in some examples. FIG. 2C depicts a flowchart for an example method 80 that ECP measurement circuitry 30 of control circuitry 22 may perform or execute in controlling the operations of disk drive 15, in accordance with aspects of the present disclosure, including operations involved in ECP measurement, illustratively such as BWS NFT protrusion measurement, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, ECP measurement circuitry 30 of control circuitry 22 may determine a plurality of readings of an energy sensor output from an energy sensor disposed on a selected head 18 during a rotation of the corresponding disk 16 (82). ECP measurement circuitry 30 may further determine an average of the readings of the energy sensor output (84). ECP measurement circuitry 30 may further use the average of the readings of the energy sensor output as a control parameter for controlling a fly height of the selected head (86). The energy sensor may comprise a read element of the head, and the readings of the sensor output may comprise readings of the readback amplitude detected by the read element. In steady-state write operations, thermal sensor readings may be proportional to readback amplitudes, and the energy sensor may comprise one or more thermal sensors of the head, and the readings of the sensor output may comprise readings of temperature detected by the one or more thermal sensors. Control circuitry 22, including ECP measurement circuitry 30, may further perform additional actions, methods, and techniques, in accordance with various aspects including as further described herein.

The term "ECP measurement circuitry 30" as used herein may refer to any hardware, firmware, software, and/or combination thereof, comprised in control circuitry 22 of disk drive 15, which implements, embodies, or engages in any of the structures or functions ascribed herein to ECP measurement circuitry 30 or to any other of the novel and inventive aspects of the present disclosure. ECP measurement circuitry 30 may constitute any hardware, firmware, software, and/or any other elements of control circuitry 22 for energized component protrusion measurement, and performing other techniques and methods as described herein.

Figure 3:
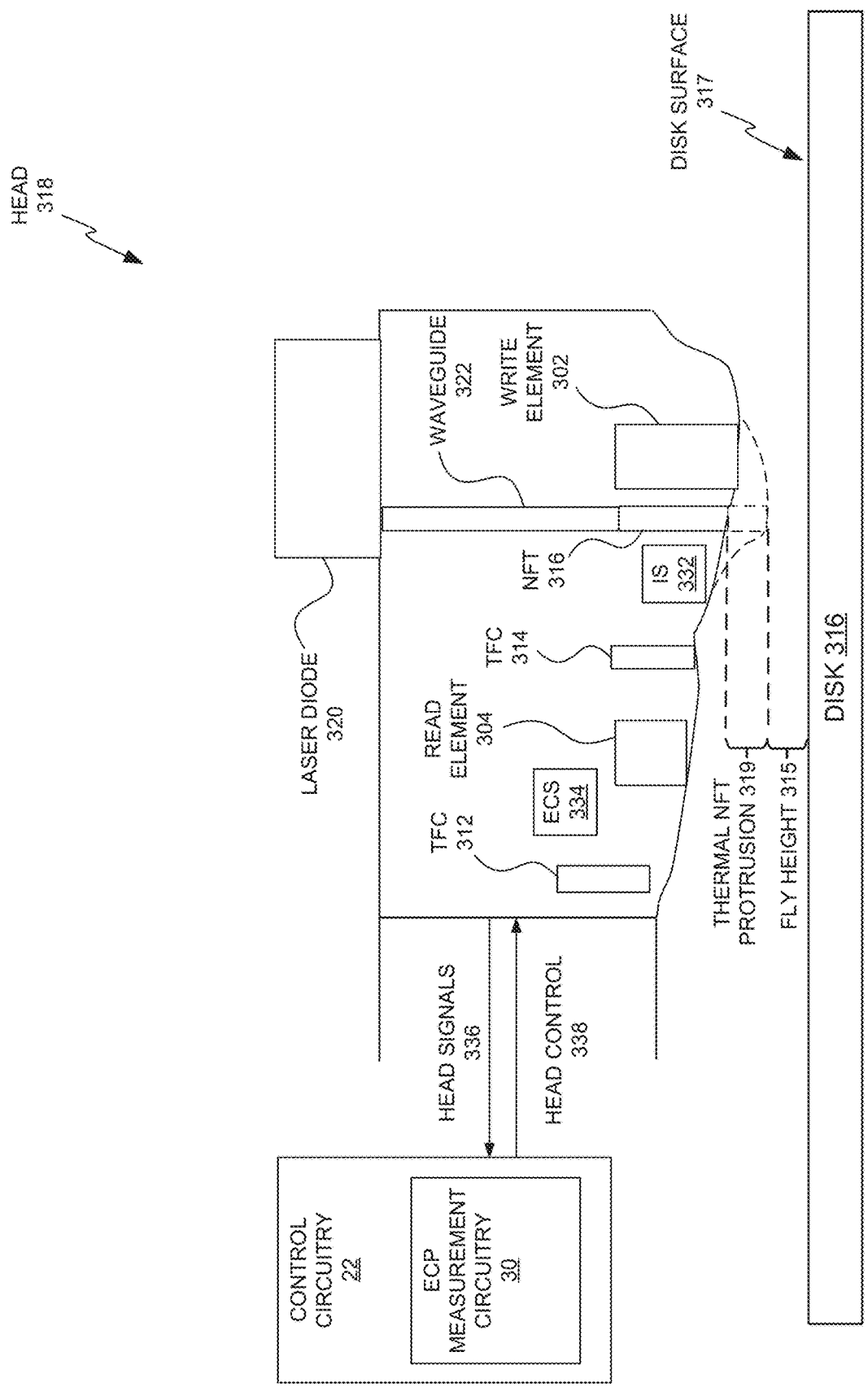
FIG. 3 depicts a conceptual side view diagram of a head of a disk drive, suspended above and operating proximate to a corresponding disk surface of a disk, in accordance with various aspects of this disclosure.

FIG. 3 depicts a conceptual side view diagram of a head 318 of a disk drive, suspended above and operating proximate to a corresponding disk surface 317 of disk 316, in accordance with various aspects of this disclosure. Disk surface 317 and head 318 may be respective implementations of any of disk surfaces 17 and heads 18 as depicted in FIGS. 2A and 2B. FIG. 3 depicts an example thermal NFT protrusion 319 and aerodynamic profile causing changes in fly height 315, or head-disk spacing, due to effects such as near-field transducer (NFT) pole tip protrusion (NPTP) of NFT 323 due to heating or other energizing by a laser or other energy source, in accordance with various aspects of this disclosure. FIG. 3 is a conceptual diagram and not an engineering schematic, and the elements depicted may be disposed in any of a variety of arrangements in different examples.

ECP measurement circuitry 30 may perform measurements of thermally induced NFT protrusion in its behavior in response to thermally-assisted write operations of head 318, including control circuitry 22 applying an energy assistance current (e.g., a laser current) to an energizing component of head 318 (e.g., laser diode 320 in the example depicted in FIG. 3, or any other kind of thermally energizing component, in other implementations of this disclosure). Control circuitry 22 may also at times simultaneously apply a write current to a magnetic write coil of write element 302, proximate to NFT 323, which may also induce thermal protrusion. The example of FIG. 3 is further described as follows with respect to the example depicted in FIG. 3 in which the disk drive is a HAMR drive and the energizing component the protrusion of which is being measured is implemented as NFT 323. Continuous data write operations may persist for much longer, such as orders of magnitude longer, than burst write scheme operations. So, continuous data write operations impose substantially greater thermal NFT protrusion 319 than burst write scheme operations. ECP measurement circuitry 30 may thus perform measurements of thermally induced protrusion of NFT 323, as further described below.

Control circuitry 22 outputs head control signals 338 to head 318, and receives head signals 336 (including control signals and data) from head 318. Head 318 includes a write element 302, a read element 304, thermal fly height (TFC) control elements 312 and 314, and a laser-generating component such as a laser diode 320 configured for emitting a laser via waveguide 322 and NFT 323. The laser induces a plasmon that heats a track on disk surface 317 that passes proximate to write element 302 as head 318 flies over or proximate to disk surface 317.

Control circuitry 22 writes data to disk surface 317 by modulating a write current in an inductive write coil in write element 302, to record magnetic transitions onto corresponding disk surface 317 in a process referred to as saturation recording. During readback, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium of disk surface 317, such as, e.g., superparamagnetic iron-platinum nanoparticles, by heating disk surface 317 with a laser emitted by laser diode 320 via waveguide 322 and NFT 323 during write operations. Such heating of disk surface 317 decreases the coercivity of the magnetic medium of disk surface 317, thereby enabling the magnetic field generated by the write coil of write element 302 to magnetize the temporarily heated area of disk surface 317. The disk surface encoding the data thus written then cools back down and thereby returns to heightened magnetic coercivity, which durably preserves the written data at higher density than is possible in conventional techniques such as perpendicular magnetic recording (PMR).

Any suitable technique may be employed to heat the surface of the disk in HAMR recording, such as with a laser-generating component such as laser diode 320 and NFT 323 disposed proximate to write element 302 of head 318. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

A certain increment of laser current may typically have a regular, predictable, linear, or approximately linear in a small operating range, corresponding with a certain increment of power, a certain incremental change in NFT protrusion displacement, and a certain incremental change in fly height spacing (within a practically applicable range), in various examples. Applicable levels of laser current, fly height, and TFC power are all discussed herein in terms of custom arbitrary units, and may be in varying ranges of values in various examples.

ECP measurement circuitry 30 of control circuitry 22 may control the operation of head 318 to perform inventive, newly accurate measurements of protrusion of NFT 323 in continuous steady-state write operations impacted by laser mode hops. For example, ECP measurement circuitry 30 may average several measurements of thermal protrusion of NFT 323. In some examples, ECP measurement circuitry 30 may average several measurements of thermal protrusion of NFT 323 over the course of one full revolution of disk 316 to perform newly accurate measurements of protrusion of NFT 323 in continuous steady-state write operations impacted by laser mode hops. In some examples, ECP measurement circuitry 30 may average measurements of thermal protrusion of NFT 323 at intervals, such as once every ten sectors or every ten servo patterns, over the course of one full revolution of disk 316, to perform newly accurate measurements of protrusion of NFT 323 in continuous steady-state write operations impacted by laser mode hops. ECP measurement circuitry 30 may also average measurements of thermal protrusion of NFT 323 at intervals of once every any number of sectors or servo patterns, at either regular or irregular intervals, over the course of any fraction of a disk revolution less than or more than one complete revolution, or any integer or non-integer number of disk revolutions, in various examples. Example details of functions and methods that ECP measurement circuitry 30 is configured to perform, in an example implementation focused on a HAMR disk drive, are further described as follows.

Heat-assisted magnetic recording (HAMR) is a promising technology to achieve high areal density (e.g., four terabytes per square inch (4 Tb/in$^2$)) for hard disk drives (HDD) such as disk drive 15. By heating disk surface media of disk surfaces 17 above the Curie temperature ($T_C$) with a laser diode, HAMR enables writing into high magnetic anisotropy (Ku) media such as $L1_0$ iron-platinum (FePt) with magnetic anisotropy of approximately 4.5×10$^7$ ergs per cubic centimeter (Ku~4.5×10$^7$ erg/cc) and a Curie temperature ($T_C$) of approximately 700 Kelvins ($T_C$~700 K). Light from the laser diode (e.g., laser diode 320) is confined into less than few tens of nanometers spot size by an NFT (e.g., NFT 323). A part of the heat absorbed in NFT 323 causes NFT to protrude which leads to head media contact risk in writing if this phenomenon isn't taken into account in head media spacing (HMS) setting. While conventional write coil-induced protrusion can be measured by touchdown-based technique, these techniques cannot be used for NFT protrusion measurements, because NFT protrusion is very localized. Since fly height or head-media spacing (HMS) is at least in part controlled by thermal fly height control (TFC) elements (e.g., heaters, and e.g., TFC control elements 312 and 314), for accurate write spacing control in HAMR, in some examples, it is necessary to measure NFT protrusion and subtract the corresponding TFC power which may be equivalent to NFT protrusion in writing. Several methods have been attempted previously: burst writing scheme (BWS), atomic force microscopy (AFM) measurements before and after burnishing with spin-stand tester, and AFM based measurements in non-head-flying condition. In these methods, BWS has an advantage in the view of by-head measurements due to non-destructive measurements. However, among the inventive insights of this disclosure, as BWS uses readback amplitude, in BWS measurements in HDDs, there is unintentional readback amplitude drop in some heads, which may causes NFT protrusion estimation error. Inventive insights of this disclosure include and are in part based on investigations into root causes of unpredictable or anomalous readback amplitude drops. Inventive aspects of this disclosure include methods to mitigate such unpredictable or anomalous readback amplitude drops, to help ensure consistently accurate measurement and determination of energy-induced protrusion of energized elements such as NFTs, and thereby to help ensure consistently accurate fly height control and consistently accurate write operations in energy-assisted magnetic recording.

Experimental methods supporting some of the inventive insights and aspects of this disclosure are described as follows. HAMR HDDs were used for experiments in a 30° C. controlled chamber. In BWS measurements, there were two writing modes which have different NFT protrusion conditions. In the first writing mode, NFT protrusion reached steady state. To ensure that the NFT was fully protruded, readback amplitude after several hundred microseconds from the start of writing was used as readback amplitude of steady-state writing. The laser diode was turned on at the start of writing. The second writing mode was burst writing, in which the laser was turned on for just only several hundred nanoseconds. NFT protrusion is negligible in this mode because laser on time is much shorter than the time constant of NFT protrusion. For all measurements in both writing modes, readback amplitude was measured under the same reader spacing condition. Therefore, readback amplitude reflects HMS in writing.

Figures 1, 4:
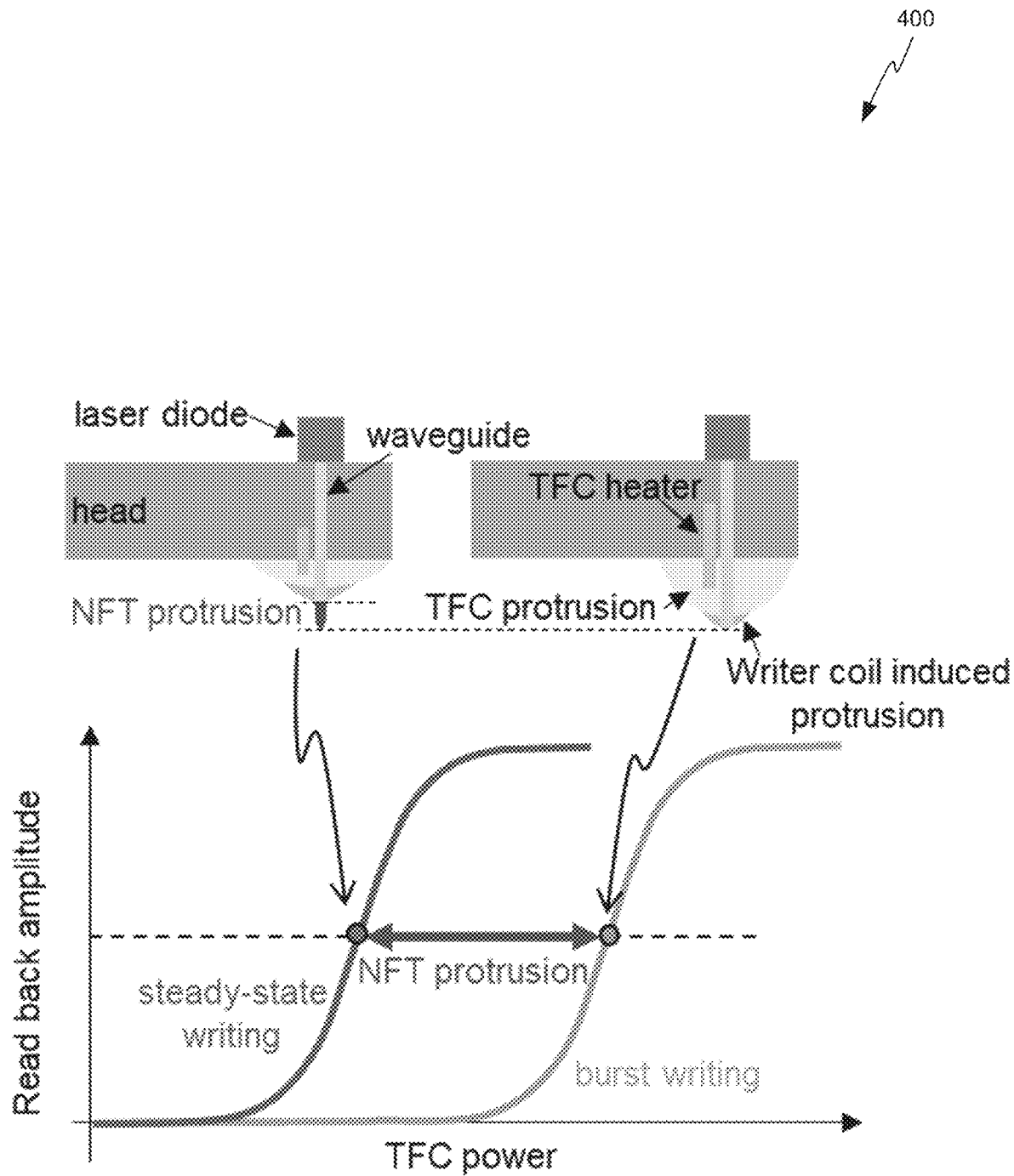

FIG. 4-1 depicts a schematic 400 of an ideal BWS curve, in accordance with aspects of the present disclosure. Two writing modes which were named steady-state writing and burst writing were implemented. Readback amplitude was measured after writing of each mode. TFC power was applied in both writing modes until saturation of readback amplitude. The light from the laser diode passed through the waveguide and the NFT, and finally reached the disk surface media. A part of the heat was absorbed in the NFT and caused NFT to protrude. In steady-state writing, the writer or head was protruded by three factors: TFC protrusion, write coil induced protrusion, and NFT protrusion. On the other hand, burst writing had quite small NFT protrusion, so it was negligible. To reach the same HMS to steady-state writing, burst writing needed more TFC protrusion corresponding to NFT protrusion in steady-state writing by applying TFC power.

FIG. 4-1 thus depicts a schematic 400 of an ideal BWS curve which is a readback amplitude curve. In both writing modes, TFC power was swept during writing. HMS in writing decreases with increasing TFC power and readback amplitude also increases monotonically. In the ideal case, the readback amplitude curve in burst writing is moved to the right side in parallel to steady-state writing. The shift of the curve from steady-state writing to burst writing is attributed to HMS change as a result of NFT protrusion difference in the two states. The difference of TFC power between steady-state writing and burst writing at a readback amplitude that reached half of the saturation amplitude may be equivalent to and defined as NFT protrusion. In BWS measurements, a key assumption is that readback amplitude is the same between steady-state writing and burst writing when HMS is the same between two writing modes. In studies in which inventive insights of this disclosure were developed, an average of multiple measurements was plotted in BWS curve to mitigate instability of measurements.

Results and discussion of those studies that helped inform inventive insights of this disclosure are described as follows. Readback amplitude drop by laser mode hopping was studied.

Figures 2, 4:
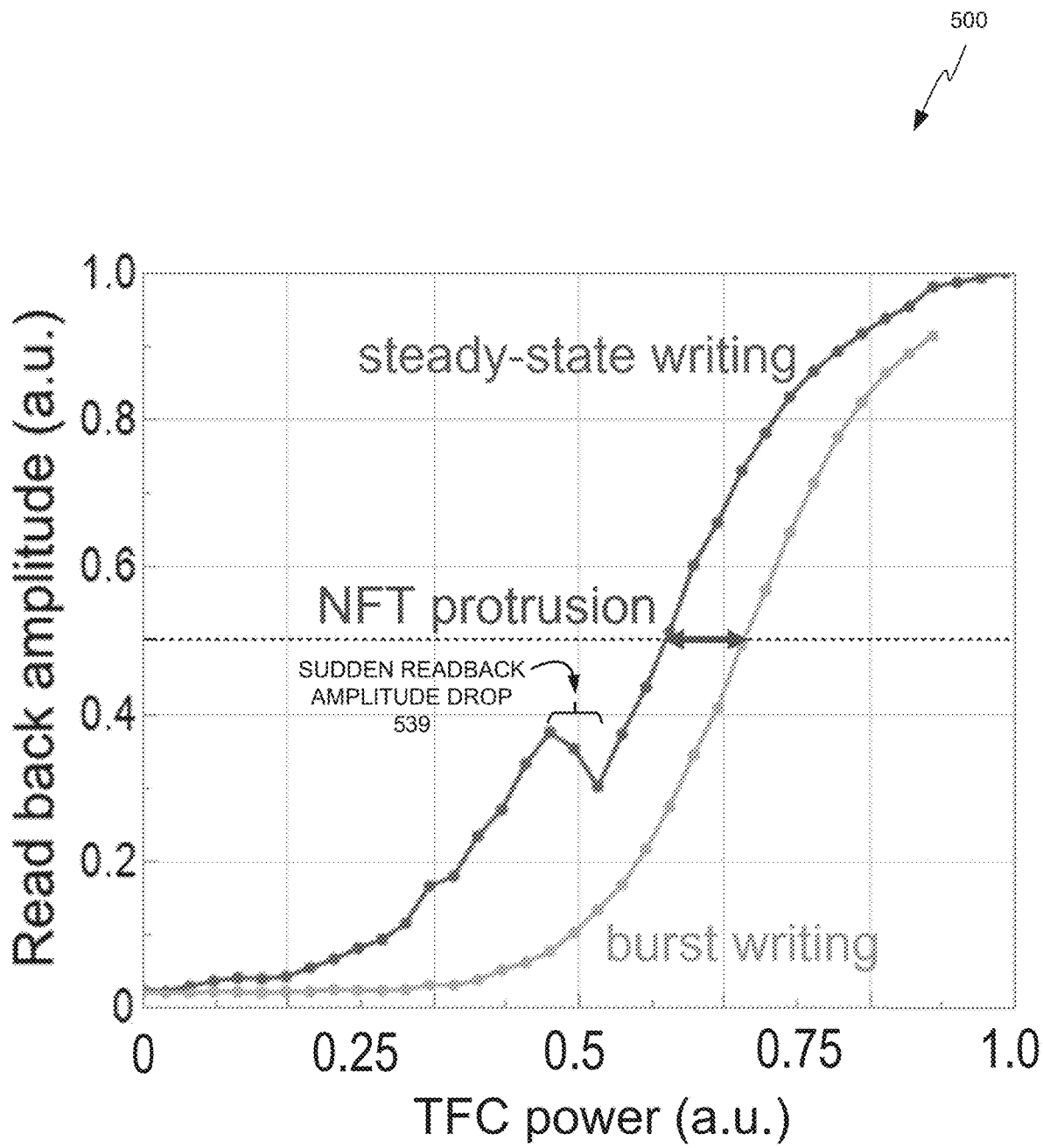

FIG. 4-2 depicts a graph 500 of an example of a BWS curve for NFT protrusion measurements, with readback amplitude along the y-axis as a function of TFC power in writing along the x-axis, both shown in custom, arbitrary units (A.U.). A sudden readback amplitude drop, indicated at 539, was observed in steady-state writing around TFC power of 0.5 A.U. A difference or delta of TFC power between steady-state writing and burst writing at normalized readback amplitude 0.5 may be equivalent to and defined as NFT protrusion, in this example. Measurement results of NFT protrusion by BWS became small due to the amplitude drop in steady-state writing, compared with cases in which an amplitude drop did not occur.

FIG. 4-2 thus depicts an example of a BWS curve for NFT protrusion measurements. In this case, readback amplitude in burst writing increased monotonically. On the other hand, unintentional readback amplitude drop was observed in steady-state writing around TFC power of 0.5 A.U. (539). Since NFT protrusion was calculated from TFC power when normalized readback amplitude reached 0.5 (50%), a calculation of NFT protrusion used the region above the amplitude drop. In the case where an amplitude drop was not observed, NFT protrusion estimation or determination would be larger than NFT protrusion in FIG. 4-2.

Figures 3A, 4:
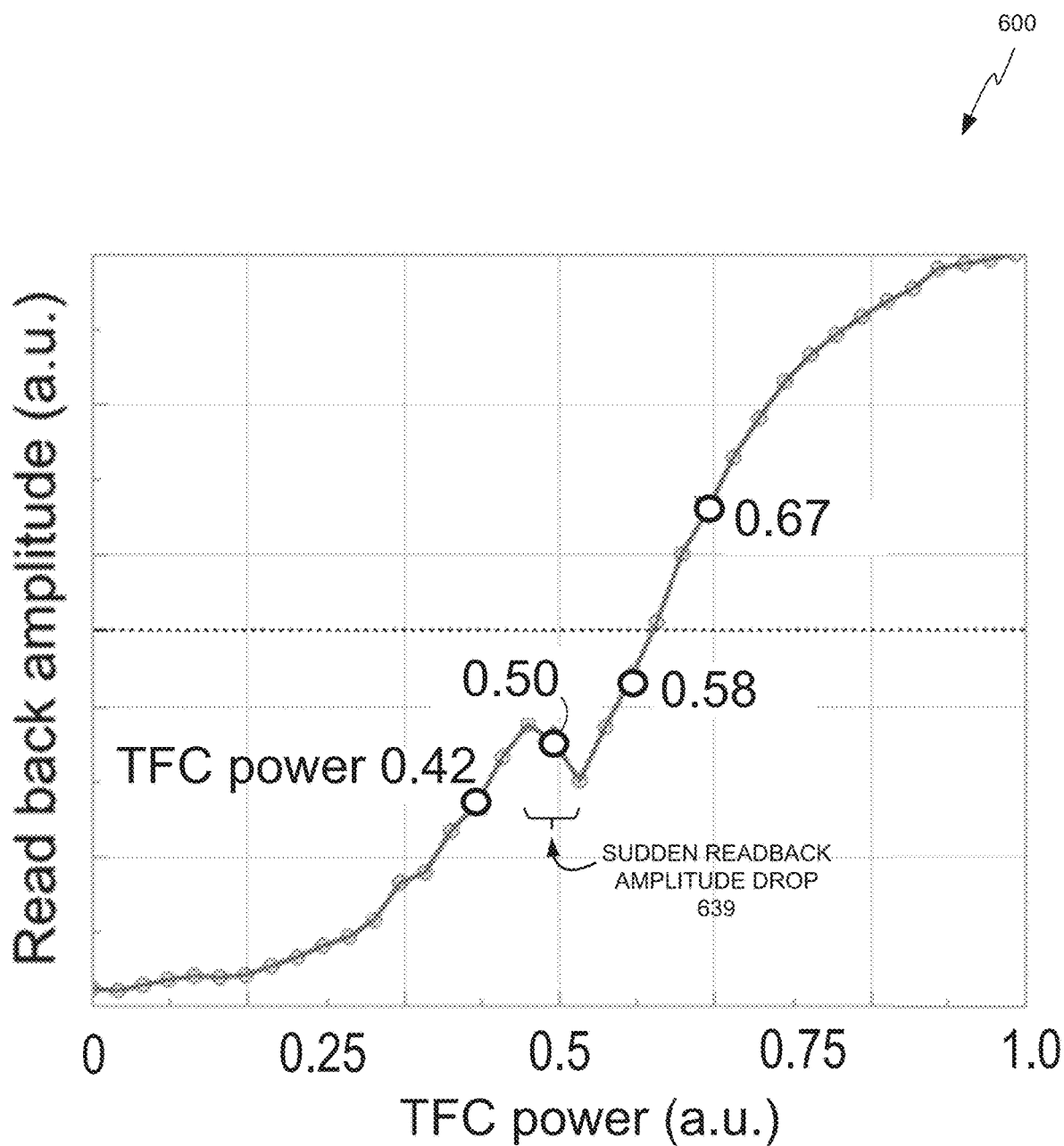
Figures 3B, 4:
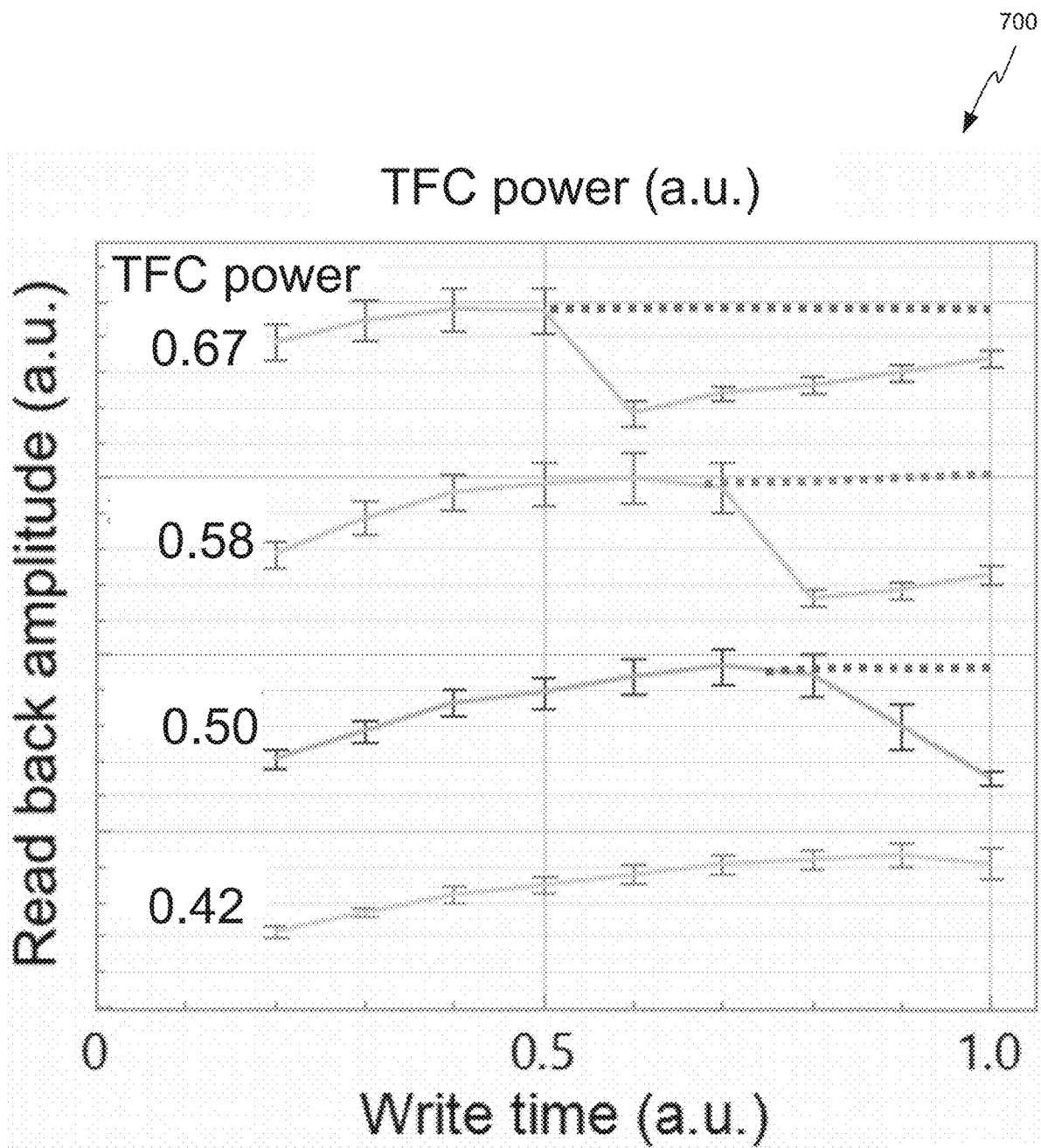
Figure 4:
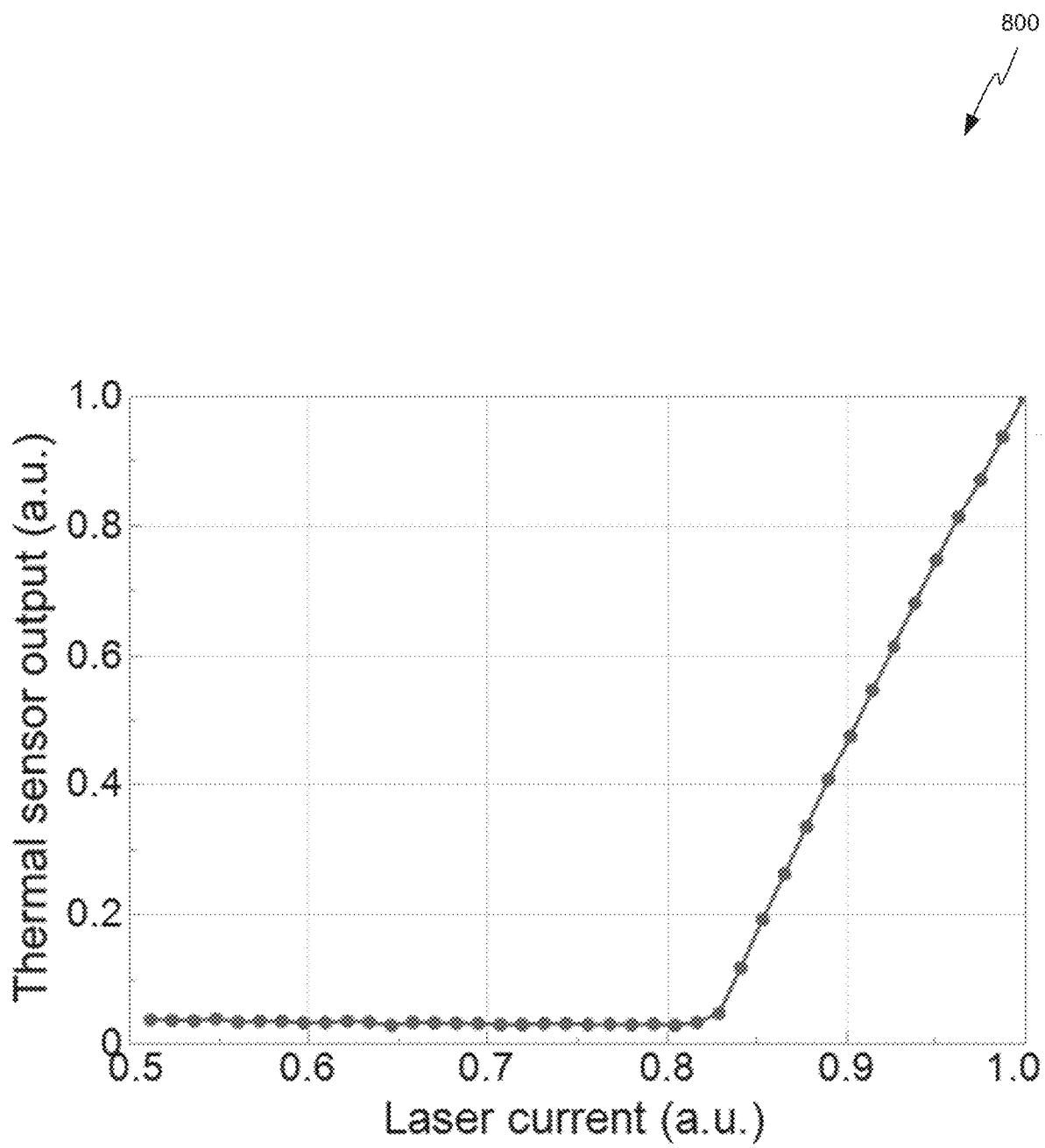

To understand the readback amplitude drop phenomenon in steady-state writing, a readback amplitude profile from the start of writing was measured for the head, which showed an amplitude drop in steady-state writing. FIG. 4-3A depicts a graph 600 of a readback amplitude drop in steady-state writing curve. An amplitude drop was observed around TFC power of 0.5 A.U., indicated at 639. FIG. 4-3B depicts a graph 700 of a readback amplitude profile from the start of writing, in accordance with aspects of the present disclosure. The last measurement point at write time=1 was after several hundred microseconds from write start.

FIG. 4-3A thus depicts an example of readback amplitude drop in steady-state writing curve, and FIG. 4-3B thus depicts the readback amplitude profile as a function of write time at each TFC power step. A steady-state writing curve such as in FIG. 4-3A used only the last measurement point at write time=1, which is obtained after several hundred microseconds from the start of writing as shown in FIG. 4-3B. It is expected that readback amplitude increases with NFT protrusion increase at the beginning of writing and readback amplitude becomes saturated after NFT protrusion reached steady state. For TFC power of 0.42 A.U., which is lower than that of 0.50 A.U. at which the amplitude drop was observed, the readback amplitude increased from the start of writing and became stable after saturation as expected. However, for the readback amplitude profile of TFC power >=0.5 A.U., which is the region above the amplitude drop in FIG. 4-3A, the readback amplitude showed a sudden decrease before reaching write time=1. In addition, as FIG. 4-3B demonstrates, the timing of the readback amplitude drop or decrease from the start of writing became earlier with TFC power increase.

Among the inventive insights of this disclosure, laser mode hopping was identified as having caused the sudden decrease in the readback amplitude in steady-state writing as shown in FIG. 4-3B. Laser mode hopping is a known problem with edge emitter laser diodes. The amount of heat provided to the media fluctuates with the laser mode hopping. Laser mode hopping in HAMR causes many problems, illustratively such as phase shift of the written pattern. Among the investigations that supported inventive insights of this disclosure, experiments were conducted with a readback amplitude readings from read element 304 to examine the relation between amplitude drops and laser mode hopping. The correlations between laser current and readback amplitude including readback amplitude drops were confirmed as shown.

FIG. 4-4 depicts graph 800 of laser current dependence of thermal sensor output, in accordance with aspects of the present disclosure. Above the lasing threshold, the thermal sensor output increased linearly with laser current increase. FIG. 4-4 thus shows the laser current dependence of the thermal sensor output. The thermal sensor output was stable below laser current 0.83 (in arbitrary custom units). In laser current above 0.83, the thermal sensor output increased linearly with laser current increase. The output of the laser diode starts to increase dramatically above the lasing threshold as a characteristic of laser diodes.

Figures 4, 5:
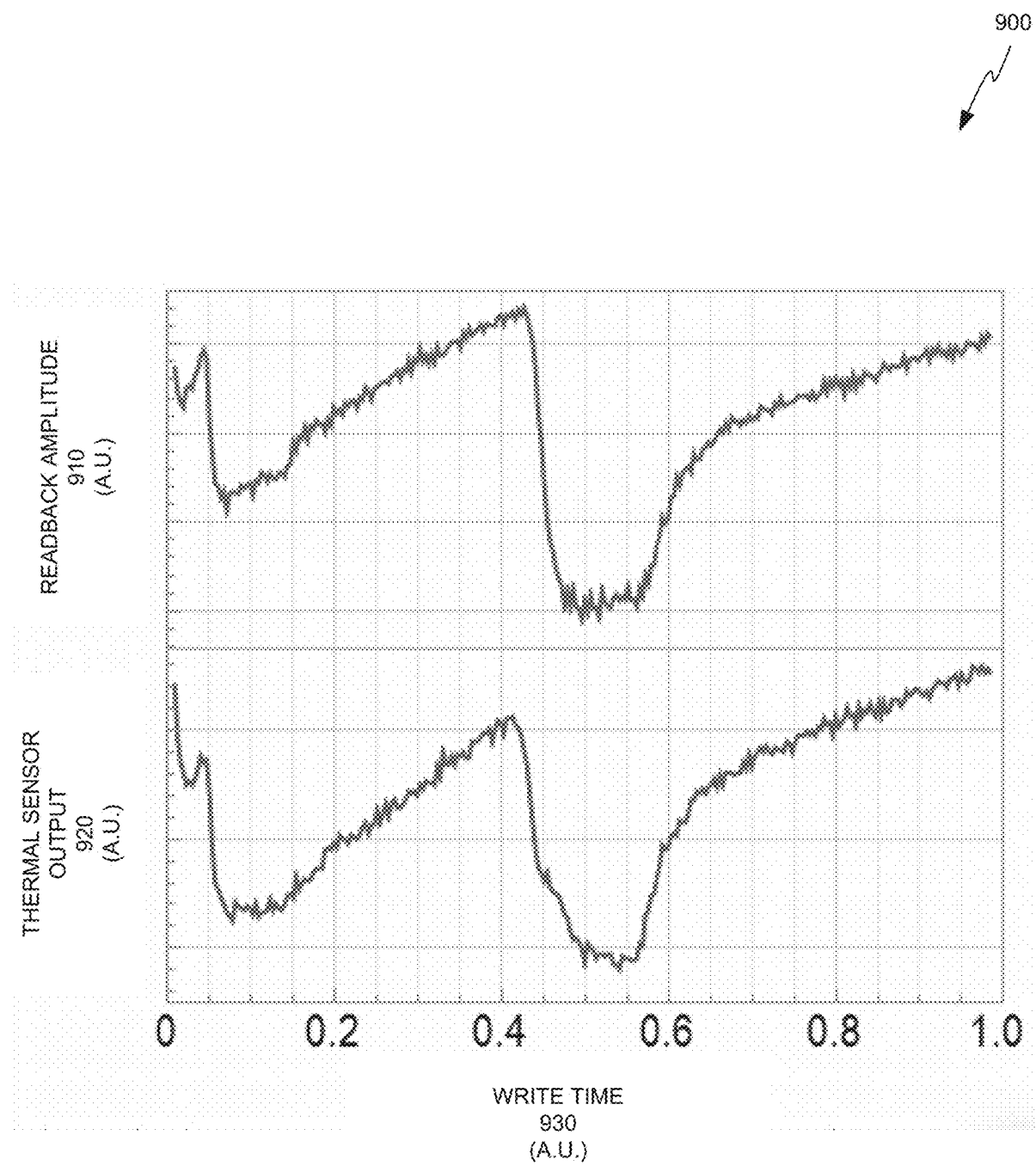

FIG. 4-5 depicts a graph 900 of simultaneous measurements of readback amplitude 910 and thermal sensor output 920 over write time 930 in one revolution of a disk of continuous writing, in accordance with aspects of the present disclosure. The thermal sensor was embedded near the NFT and reflected NFT temperature. The abrupt changes of the thermal sensor output are determined to be due to laser mode hopping. The readback amplitude changed synchronously with thermal sensor output change.

Among the inventive insights of this disclosure, since it is demonstrated that thermal sensor output reproduces laser current with close precision in continuous or steady-state write operations, laser power change may be detected by the thermal sensor in continuous or steady-state write operations. FIG. 4-5 shows simultaneous measurements of readback amplitude and thermal sensor output in one revolution of continuous writing. The thermal sensor output changed rapidly four times in one revolution continuous writing. Since it is known that laser power changes abruptly with mode hopping, thermal sensor output change which happened four times in one revolution writing is likely due to laser mode hopping. At the timing of laser mode hopping, as diagnosed via the proxy of the thermal sensor output, the readback amplitude also changed rapidly. This is indicative that readback amplitude changed with laser mode hopping, even though the HMS setting in the write operation was kept constant with constant TFC power. The concomitant changes of readback amplitude and thermal sensor output shown in FIG. 4-5 demonstrate that the sudden amplitude decrease in steady-state writing in the amplitude profile of FIG. 4-3B was caused by laser mode hopping.

Modes of a laser diode depend on the laser diode temperature. Likewise, the temperature of the system of the head rises with TFC power increase. As depicted in FIG. 4-3B, the timing of the amplitude drops become earlier with TFC power increase. This is indicative that the timing of laser mode hops depends on TFC power, in some examples. As shown in FIG. 4-2, the magnitude of amplitude drops in steady-state writing was large compared to the difference of TFC power between steady-state writing and burst writing, which was defined as NFT protrusion. Since readback amplitude under saturation was used in BWS, readback amplitude in BWS is considered quite sensitive compared to that in normal data pattern writing, in which readback amplitude is saturated.

Inventive aspects of this disclosure include methods of averaging of one revolution of continuous steady-state writing. Since readback amplitude variations in steady-state writing are due to laser mode hopping, ECP measurement circuitry 30 may extract stable readback amplitude in steady-state writing, in aspects of this disclosure. In some examples, average readback amplitude in one revolution of continuous steady-state writing can represent an amplitude value for a steady-state writing curve, since it averages over the effects of several laser modes.

Figures 4, 5, 6:
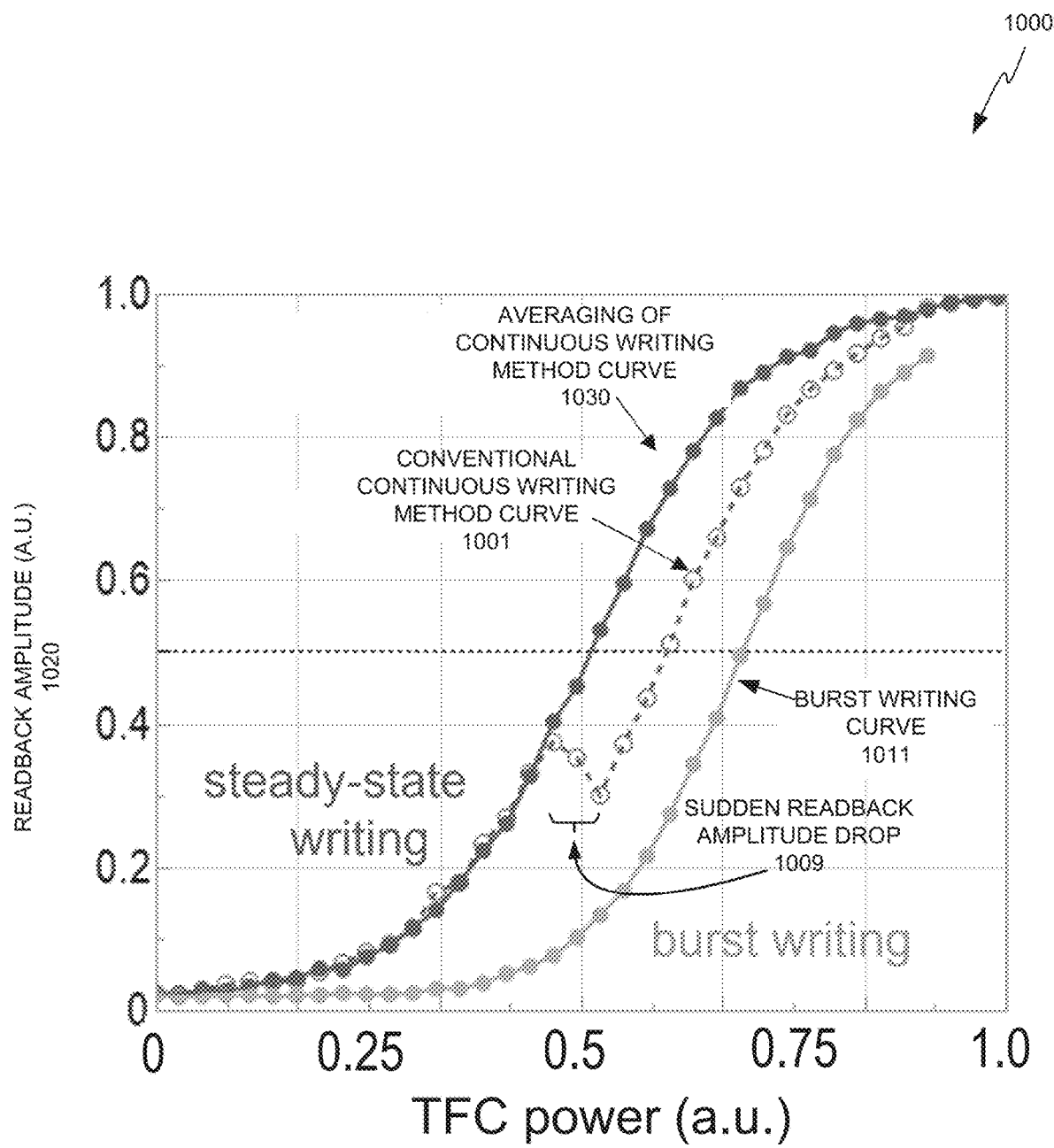
Figure 5:
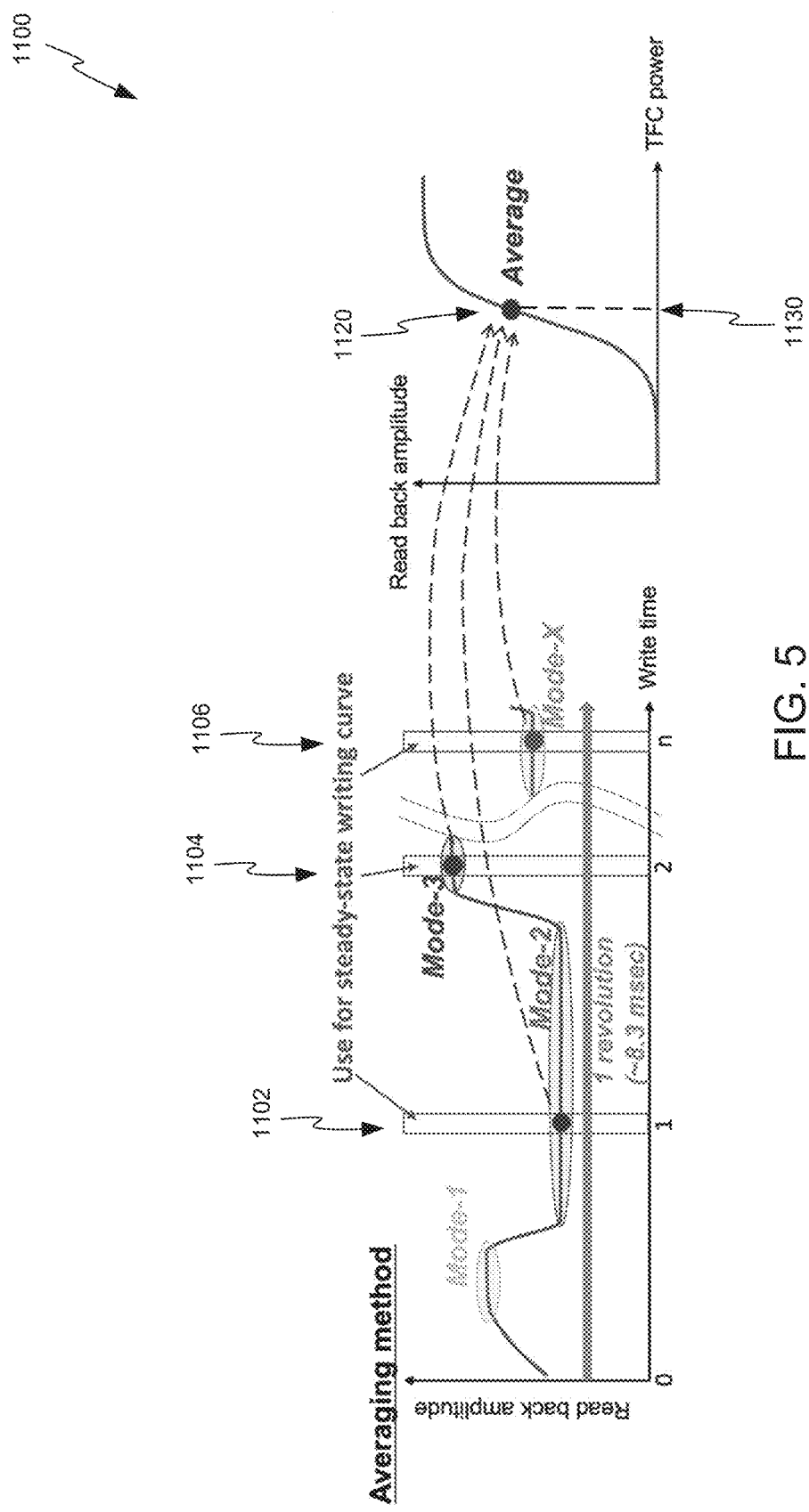
Figure 6:
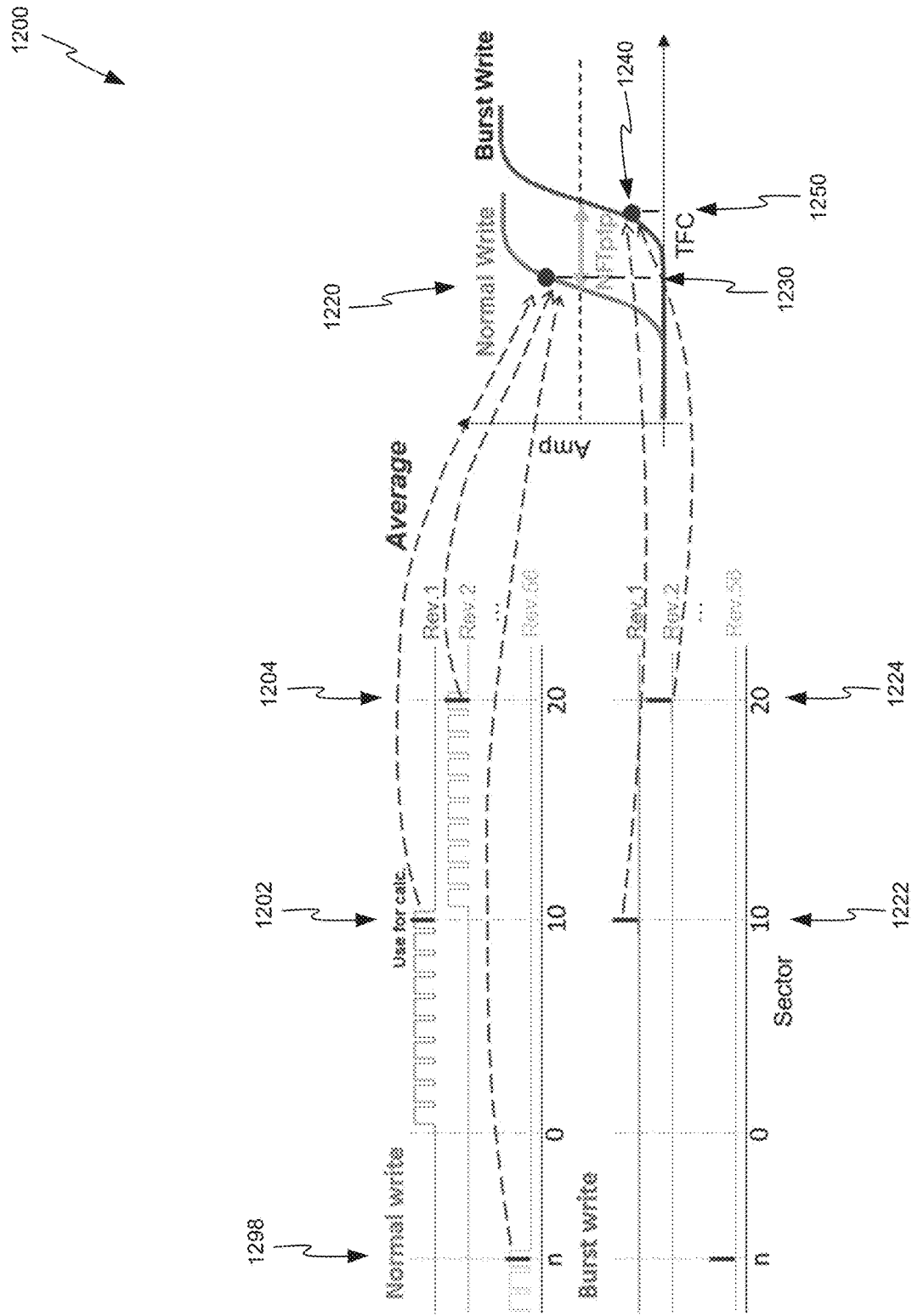

FIG. 4-6 depicts graph 1000 of BWS curves of readback amplitude 1020 over TFC power, both in arbitrary units, with two steady-state writing methods: an inventive method of this disclosure of averaging of one revolution continuous steady-state writing, shown on ideal or near-ideal curve 1030, in accordance with aspects of the present disclosure, and a conventional method that uses only the specific time after several hundred microseconds from the start of writing, shown on curve 1001. Curve 1030 is in the form of a smooth, approximately sigmoid curve, and is indicative of successful and accurate laser mode hop mitigation, and consistently nominal write operation control parameters. Curve 1001, in contrast, shows a sudden readback amplitude drop 1009 indicative of unmitigated anomalous laser mode hop and unmitigated anomalous discontinuity in write operation control parameters. With the inventive method of this disclosure of averaging over one revolution of continuous steady-state writing, shown in curve 1030, readback amplitude in steady-state writing curve increases gradually without sudden drop by mode hopping. NFT protrusion with averaging of one revolution in a continuous steady-state writing method was approximately twice as large as NFT protrusion with a conventional steady-state writing method. Clearly, laser mode hopping has a large impact on NFT protrusion measurements in BWS. In a total of 62 heads being operated in example implementations of ECP measurement circuitry 30 of this disclosure, in one example set of measurements, remarkably, none of the heads showed any amplitude drop, which provides powerful confirmation of inventive advantages of this disclosure.

FIG. 4-6 thus shows BWS curves of a head in which readback amplitude drop observed in steady-state writing curve with a conventional method. In an inventive method of this disclosure of performing averaging of one revolution of continuous steady-state writing, steady-state writing curve increased with TFC power increase without amplitude drop. As a result of amplitude drop prevention in accordance with an example of this disclosure, NFT protrusion with ECP measurement circuitry 30 applying an averaging continuous writing method in accordance with an example of this disclosure was approximately twice as large (with appropriate conversion constant between applied power and resulting protrusion, as understood in the art) as NFT protrusion with a conventional steady-state writing method.

Laser mode hopping in burst writing may be contrasted with laser mode hops in steady-state writing. Readback amplitude drops are observed in steady-state writing curves in conventional operation methods in some heads. On the other hand, significant readback amplitude drops as seen in steady-state writing were not observed in investigated examples of burst writing curves, such as example burst writing curve 1011 depicted in FIG. 4-6. In example studies, both steady-state writing curves and burst writing curves used averages of multiple measurements. It's not clear why amplitude drop was not observed in burst writing. There are some possible reasons such as less or no laser mode hopping in burst writing and averaging effect of multiple measurements. To understand the stability of readback amplitude in burst writing which could be affected by laser mode hopping and to ensure the reliability of BWS measurements, further investigations of mode hopping in burst writing are contemplated.

Readback amplitude drops in steady-state writing curves with conventional operational methods is observed in some heads, and has large impacts on measurement results of NFT protrusion. From the results of readback amplitude profiles from the start of writing and simultaneous measurements of readback amplitude and thermal sensor output in one revolution of continuous writing, it is demonstrated that, in some examples, laser mode hopping typically happens several times in one revolution of continuous writings and readback amplitude drops in steady-state writing curves with conventional methods were caused by variations in net effective heat-assisted write power due to laser mode hopping. To mitigate readback amplitude drop in steady-state writing curves and to measure NFT protrusion stably regardless of laser mode hopping, example methods and ECP measurement circuitry 30 of this disclosure may plot an average of energized component sensor readings, e.g., readback amplitudes or thermal sensor readings, from, e.g., one revolution of continuous steady-state writing, which includes several laser modes, and the effects of several laser mode hops, as a steady-state writing curve. Readback amplitude drops were not observed with averaging one revolution of continuous steady-state writing, in example methods of this disclosure. For accurate BWS measurements, various examples of this disclosure may address the potential role of laser mode hopping in burst writing, which could affect the stability of readback amplitude even though a laser mode hopping effect is not clearly observed in some examples of burst writing.

FIG. 5 depicts a graph 1100 of ECP measurement circuitry 30 averaging a plurality of readings of readback amplitude 1102, 1104, 1106 detected by read element 304 at various points in time over a continuous write operation, to determine an averaged readback amplitude 1120 of the readings of the energy sensor output of read element 304, in accordance with aspects of the present disclosure. Readings of readback amplitude 1102, 1104, 1106 are representative of a large number or any number of readback amplitudes that ECP measurement circuitry 30 may gather and average together, such as one readback amplitude every ten data sectors across 576 sectors in a revolution of the disk, in an illustrative example. ECP measurement circuitry 30 may then use the average of the readings of the energy sensor output as a control parameter for controlling a fly height of the selected head 318. In particular, ECP measurement circuitry 30 may then set a value of TFC power 1130 to apply to TFC control elements 312 and 314, by determining the value of TFC power 1130 that corresponds to averaged readback amplitude 1120 in the relation between averaged readback amplitude and TFC power represented by the graph of readback amplitude to TFC power in graph 1100.

FIG. 6 depicts a graph 1200 of ECP measurement circuitry 30 averaging pluralities of readings of readback amplitude detected by read element 304 at various points in time over both a continuous write operation and a burst write operation to determine averaged readback amplitudes 1220 of the readings of the energy sensor output of read element 304 in both a continuous write operation and in a burst write scheme write operation, in accordance with aspects of the present disclosure. Graph 1200 depicts ECP measurement circuitry 30 averaging a plurality of readings of illustrative readback amplitude 1202, 1204, . . . , 1298 detected by read element 304 at various points in time over a continuous write operation, to determine an averaged readback amplitude 1220 of the readings of the energy sensor output for a continuous write operation. Graph 1200 of FIG. 12 also depicts ECP measurement circuitry 30 averaging a plurality of illustrative readings of readback amplitude 1222, 1224 detected by read element 304 at various points in time over a burst write operation, to determine an averaged readback amplitude 1220 of the readings of the energy sensor output in a burst write operation. Readings of readback amplitude 1202, 1204, . . . , 1298 and readback amplitude 1222, 1224 are representative of a large number or any number of readback amplitudes that ECP measurement circuitry 30 may gather and average together, such as one readback amplitude every ten data sectors across 576 sectors in a revolution of the disk in both a continuous write operation and in a burst write operation, in an illustrative example.

ECP measurement circuitry 30 may then use the averages of the readings of the read element readback amplitude energy sensor outputs in both a continuous write operation and in a burst write operation as respective control parameters for controlling a fly height of the selected head 318 in both continuous write operations and in burst write operations. In particular, ECP measurement circuitry 30 may then set a value of TFC power 1230 to apply to TFC control elements 312 and 314 in continuous write operations, by determining the value of TFC power 1230 that corresponds to averaged readback amplitude 1220 in continuous write operations in the relation between averaged readback amplitude and TFC power represented by the graph of readback amplitude to TFC power in graph 1200. ECP measurement circuitry 30 may also set a value of TFC power 1250 to apply to TFC control elements 312 and 314 in burst write operations, by determining the value of TFC power 1250 that corresponds to averaged readback amplitude 1240 in continuous write operations in the relation between averaged readback amplitude and TFC power represented by the graph of readback amplitude to TFC power in graph 1200. Using the average of the readings of the energy sensor output as the control parameter for controlling a fly height of the selected head may include ECP measurement circuitry 30 applying a fly height control signal to one or more fly height control components such as TFC control elements 312 and 314 of the selected head 318, at a fly height control amplitude 1230, 1250, respectively, that corresponds to the averages 1220, 1240, respectively, of the readings of the energy sensor output.

Various aspects are thus directed to a data storage device, comprising: one or more disks; an actuator mechanism configured to position a selected head among one or more heads proximate to a corresponding disk surface of a corresponding disk among the one or more disks; and one or more processing devices, such as ECP measurement circuitry 30. ECP measurement circuitry 30 may be configured to: determine a plurality of readings of an energy sensor output from an energy sensor disposed proximate to an energized component of the selected head during a rotation of the corresponding disk; determine an average of the readings of the energy sensor output; and use the average of the readings of the energy sensor output as a control parameter for controlling a fly height of the selected head.

In various aspects, the energy sensor comprises read element 304, and the readings of the sensor output comprise readings of readback amplitude detected by read element 304. In various aspects, the energy sensor comprises one or more thermal sensors. In various aspects, determining the plurality of readings of the energy sensor output from the energy sensor comprises determining a plurality of readings from a thermal sensor disposed proximate to a near-field transmitter comprised in the selected head. In various aspects, the near-field transmitter is configured to transmit a laser generated by a laser diode comprised in the selected head. In various aspects, determining the average of the readings of the energy sensor output comprises averaging readings of the energy sensor output from once per a selected number of sectors. In various aspects, determining the average of the readings of the energy sensor output comprises averaging readings of the energy sensor output from once every ten sectors. In various aspects, determining the average of the readings of the energy sensor output comprises averaging readings of the energy sensor output from a selected amount of revolutions of the selected disk. In various aspects, determining the average of the readings of the energy sensor output comprises averaging readings of the energy sensor output from one complete revolution of the selected disk. In various aspects, using the average of the readings of the energy sensor output as a control parameter for controlling the fly height of the selected head comprises applying power to one or more thermal fly height control components comprised in the selected head with a value of power based on the average of the readings of the energy sensor output. In various aspects, determining the plurality of readings of the energy sensor output from the energy sensor comprises: operating the selected head in a steady-state write mode; and determining the plurality of readings of the energy sensor output from the energy sensor while operating the selected head in the steady-state write mode.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
one or more disks;
an actuator mechanism configured to position a selected head among one or more heads proximate to a corresponding disk surface of a corresponding disk among the one or more disks; and
one or more processing devices configured to:
determine a plurality of readings of an energy sensor output from an energy sensor disposed on the selected head during a rotation of the corresponding disk;
determine an average of the readings of the energy sensor output; and
use the average of the readings of the energy sensor output as a control parameter for controlling a fly height of the selected head.

2. The data storage device of claim 1, wherein the energy sensor comprises a read element, and the readings of the sensor output comprise readings of readback amplitude.

3. The data storage device of claim 1, wherein determining the plurality of readings of the energy sensor output from the energy sensor comprises determining a plurality of readings from a thermal sensor disposed proximate to a near-field transmitter comprised in the selected head.

4. The data storage device of claim 3, wherein the near-field transmitter is configured to transmit a laser generated by a laser diode comprised in the selected head.

5. The data storage device of claim 1, wherein determining the average of the readings of the energy sensor output comprises averaging readings of the energy sensor output from once per a selected number of sectors.

6. The data storage device of claim 1, wherein determining the average of the readings of the energy sensor output comprises averaging readings of the energy sensor output from once every ten sectors.

7. The data storage device of claim 1, wherein determining the average of the readings of the energy sensor output comprises averaging readings of the energy sensor output from a selected amount of revolutions of the selected disk.

8. The data storage device of claim 1, wherein determining the average of the readings of the energy sensor output comprises averaging readings of the energy sensor output from one complete revolution of the selected disk.

9. The data storage device of claim 1, wherein using the average of the readings of the energy sensor output as a control parameter for controlling the fly height of the selected head comprises applying power to one or more thermal fly height control components comprised in the selected head with a value of power based on the average of the readings of the energy sensor output.

10. The data storage device of claim 1, wherein determining the plurality of readings of the energy sensor output from the energy sensor comprises:
operating the selected head in a steady-state write mode; and
determining the plurality of readings of the energy sensor output from the energy sensor while operating the selected head in the steady-state write mode.

11. The data storage device of claim 1, wherein the one or more processing devices are further configured such that:

determining the plurality of readings of the energy sensor output comprises determining a plurality of readback amplitudes during a continuous read operation and determining a plurality of readback amplitudes during a burst write operation,
determining the average of the readings of the energy sensor output comprises determining an average of the readback amplitudes during the continuous read operation and determining an average of the readback amplitudes during the burst write operation, and
using the average of the readings of the energy sensor output as a control parameter for controlling a fly height of the selected head comprises using the average of the readback amplitudes during the continuous read operation as a control parameter for controlling a fly height of the selected head during continuous read operations, and using the average of the readback amplitudes during the burst read operation as a control parameter for controlling a fly height of the selected head during burst read operations.

12. The data storage device of claim 1, wherein the one or more processing devices are further configured such that using the average of the readings of the energy sensor output as the control parameter for controlling a fly height of the selected head comprises applying a fly height control signal to one or more fly height control components of the selected head, at a fly height control amplitude that corresponds to the average of the readings of the energy sensor output.

13. A method comprising:
determining, by one or more processing devices, a plurality of readings of an energy sensor output from an energy sensor disposed on a selected head during a rotation of a corresponding disk of one or more disks comprised in a data storage device;
determining, by one or more processing devices, an average of the readings of the energy sensor output; and
using, by one or more processing devices, the average of the readings of the energy sensor output as a control parameter for controlling a fly height of the selected head.

14. The method of claim 13, wherein the energy sensor comprises a read element, and the readings of the sensor output comprise readings of readback amplitude.

15. The method of claim 13, wherein determining the plurality of readings of the energy sensor output from the energy sensor comprises determining a plurality of readings from a thermal sensor disposed proximate to a near-field transmitter comprised in the selected head.

16. The method of claim 15, wherein the near-field transmitter is configured to transmit a laser generated by a laser diode comprised in the selected head.

17. The method of claim 13, wherein determining the average of the readings of the energy sensor output comprises averaging readings of the energy sensor output from once per a selected number of sectors.

18. One or more processing devices comprising:
means for determining a plurality of readings of an energy sensor output from an energy sensor disposed on a selected head during a rotation of a corresponding disk of one or more disks comprised in a data storage device;
means for determining an average of the readings of the energy sensor output; and
means for using the average of the readings of the energy sensor output as a control parameter for controlling a fly height of the selected head.

19. The one or more processing devices of claim 18, wherein the energy sensor comprises a read element, and the readings of the sensor output comprise readings of readback amplitude.

20. The one or more processing devices of claim 18, wherein the means for determining the plurality of readings of the energy sensor output from the energy sensor comprises means for determining a plurality of readings from a thermal sensor disposed proximate to a near-field transmitter comprised in the selected head.

* * * * *